United States Patent Office 3,330,625
Patented July 11, 1967

3,330,625
HYDROGEN PEROXIDE MANUFACTURE
Paul H. Baker, Akron, and James A. Cook, Barberton, Ohio, assignors to Pittsburgh Plate Glass Company, Pittsburgh, Pa., a corporation of Pennsylvania
No Drawing. Filed Oct. 22, 1963, Ser. No. 318,071
7 Claims. (Cl. 23—207)

This invention relates to the manufacture of hydrogen peroxide. More particularly it relates to a cyclic process for the production of hydrogen peroxide which involves catalytic hydrogenation of a quinone or nuclear hydrogenated quinone to produce the corresponding quinol or hydroquinone, followed by reaction thereof with oxygen to liberate hydrogen peroxide and regenerate for reuse the quinone. It especially relates to the conversion of inert by-products which accumulate during such cyclic process to substances which have capacity to generate hydrogen peroxide.

In the quinone process for the manufacture of hydrogen peroxide, elemental hydrogen and an elemental oxygen-bearing gas are combined to form hydrogen peroxide. This is accomplished by catalytic reduction with hydrogen gas of an anthraquinone such as 2-ethylanthraquinone dissolved in organic solvent while contacting the solution with hydrogenation catalyst such as palladium on sodium aluminasilicate. After reduction, the hydrogenated (reduced) anthraquinone or anthrahydroquinone is separated from the hydrogenation catalyst and contacted in an oxidizing zone with an oxygen bearing gas. On oxidation the anthrahydroquinone is reconverted to the original anthraquinone and hydrogen peroxide. The hydrogen peroxide so formed is extracted from the organic solution with water. After separation, the aqueous layer containing dilute hydrogen peroxide is processed further to obtain concentrated and purified hydrogen peroxide, while the organic working solution of anthraquinone derivative is recycled to repeat the process.

Quinones, in general, and particularly alkylanthraquinones may be utilized in this process, although one preferred anthraquinone is 2-ethylanthraquinone. During hydrogenation of the organic solution of 2-alkylanthraquinone to form 2-alkylanthrahydroquinone, hydrogenation reactions other than the principal reaction occur. Most prominent of these side reactions is usually regarded as involving selective hydrogenation of one aromatic nucleus to form 2-alkylhydroanthrahydroquinone. Thus, during the repeated hydrogenation of working solutions containing 2-ethylanthraquinone which occur in the cyclic operations, significant concentrations of 2-ethyltetrahydroanthrahydroquinone build-up in the working solution. On oxidation this material also forms hydrogen peroxide, but reverts to a tetrahydrogenated 2-ethylanthraquinone rather than the original 2-ethylanthraquinone. This oxidation proceeds at a much slower rate than the oxidation of 2-ethylanthrahydroquinone. For this reason, processes for treating the working solution have been devised which have as their object the conversion of the tetrahydro form to the original 2-alkylanthraquinone. In addition to the formation of 2-alkyltetrahydroanthraquinone, hydrogenated derivatives or degradation products of unknown structure are also formed. These hydrogenated derivatives do not apparently convert to materials useful in the generation of hydrogen peroxide under those conditions which convert the tetrahydro forms.

Now it has been discovered that inerts such as tetrahydroanthraquinone and tetrahydroanthrahydroquinone derivatives and more highly hydrogenated or degraded products present in alkylanthraquinone working solution which derivatives or degraded products tend to build up during the course of producing hydrogen peroxide by cyclic autooxidation processes may be converted to substances which are capable of generating hydrogen peroxide in such cyclic processes. Thus, working solutions of 2-alkylanthraquinone or like quinone which have lost a significant proportion of their hydrogen peroxide-forming capacity (as a result, for example, of hydrogenation of 2-alkylanthraquinone to inert material) may be treated to recover therefrom an increased proportion of 2-alkylanthraquinone or like quinol and otherwise increase their capacity to generate hydrogen peroxide by the practice of this invention.

In accordance with this invention, organic working solutions of quinones such as 2-alkylanthraquinone which have reduced hydrogen peroxide forming capacity, for example because they have through use built up significant quantities of degradation products of the quinones are, after removal of solvent, subjected to elevated temperatures above 200° C., usually at least 250° C. but rarely above 300° C., for limited periods of time in an inert atmosphere. Thus, in a typical method a working solution which evidences declining capacity to generate hydrogen peroxide (in the cyclic process for production of hydrogen peroxide) is removed from the cyclic system and freed of most if not all of its solvent leaving a solvent-lean residue which is heated above 200° C. for at least 5 minutes and usually for from 3 to 90 minutes. An inert atmosphere is provided autogenously by the vapors or residual solvent but may also be supplied by introducing an inert gas such as nitrogen if desired. This heating procedure causes a significant decline in the "inert solids" (materials which do not generate hydrogen peroxide readily) and corresponding increase in "actives" or hydrogen peroxide generating capacity. Thereafter, the treated residue of organic material having enhanced capacity to generate hydrogen peroxide is returned to the cyclic system, for example, by first dissolving it in carrier solvent and when necessary filtering to remove any insoluble material, notably inorganic material such as catalysts which may have been added to enhance the effect of the heat treatment.

Organic working solutions in the cyclic process for producing hydrogen peroxide to which this invention has relevance are prepared by selection of suitable solvent for both the quinone form and the hydroquinone form of the anthraquinone to permit obtaining concentrations appropriate for effective use in an operating hydrogen plant. Since the solubility of quinone and hydroquinone forms differ in the various more recognized solvents, it is not unusual to use a mixture of solvents rather than a single chemical compound which is a solvent for both forms. Other prerequisites for useful solvents (or carriers) are a substantial degree of inertness under the prevailing conditions, water insolubility and a high degree of tolerance against degradation. The literature describes many solvents or solvent mixtures for this use. Since this invention and its effect of regenerating hydrogen peroxide forming capacity of active material in the working solution does not depend upon the carrier or solvent for its performance, any solvent system may be subjected to the contemplated invention.

One useful mixed solvent comprises equal parts by volume of methylcyclohexyl acetate and dodecylbenzene. Other typical solvent mixtures include: methyl ethyl ketone and dodecylbenzene, benzene and methylcyclohexyl acetate, diisobutylcarbinol and α-methylnaphthylene, and xylene and methylcyclohexanol.

As the working solution is subjected to alternate hydrogenation and oxidation its hydrogen peroxide forming capacity decreases, apparently continuously. If this is allowed to continue uninterrupted, the working solution will become useless ultimately or becomes so degraded due to the formation of forms which convert to hydrogen peroxide too slowly and forms which will not convert to hydrogen peroxide by usual processing that its continued use is economically impractical. These undesirable effects are circumvented or minimized in the present invention, usually by treating a portion of the working solution which has been withdrawn from the cyclic system. Preferably, this is done by continuously or periodically withdrawing a small portion of the working solution for regeneration of the inactive material and the return to the system of the regenerated materials. It is, however, also possible to regenerate the inerts after they have developed to the point where the working solution is impractically low in hydrogen peroxide generating capacity.

It is preferable to withdraw working solution from a point in the cyclic process which is subsequent to the extraction of hydrogen peroxide but prior to hydrogenation, although it may be withdrawn at other points in the cyclic process. Working solution prior to hydrogenation but after extraction of hydrogen peroxide contains 2-ethyltetrahydroanthraquinone or like tetrahydroquinone in the cyclic system. As the working solution is re-cycled, the amount of tetrahydroquinone and more highly hydrogenated material increases while the 2-ethylanthraquinone or like quinone concentration decreases correspondingly until the hydrogen peroxide generating capacity of the working solution has decreased significantly and ultimately has become impractically low. This deterioration may be followed by periodic analyses of the working solution. One convenient method of following the hydrogen peroxide generating capacity of the working solution which is often employed comprises hydrogenation of a test portion of the working solution. This hydrogenated test portion of the working solution is then subjected to subsequent oxidation and extraction to generate the equivalent hydrogen peroxide which may be determined analytically without isolation. Thus, it is not necessary to determine the actual composition of the working solution in order to periodically determine its hydrogen peroxide generating capacity. When this technique is employed with a working solution, it is customary to express directly the hydrogen peroxide generating capacity per liter of working solution. Thus, a working solution which contains 150 grams of 2-ethylanthraquinone per liter of solution has hydrogen peroxide generating capacity of 21.6 grams of hydrogen peroxide equivalent. At 50 percent conversion to the reduced or hydroquinone form, the solution is said to carry 10.8 grams of hydrogen peroxide since this amount of hydrogen peroxide would be released by oxidation of such a working solution. Hence, in the practice of this invention, periodic withdrawal for regeneration of a portion of the working solution is made when the direct determination of its hydrogen peroxide forming capacity indicates that such capacity has decreased to 4.0 grams of hydrogen peroxide equivalent per liter of solution or even less, depending upon economics. When it is desired to continuously withdraw the working solution for regeneration in the practice of this invention, the same method of measuring the hydrogen peroxide forming capacity may be used to determine whether the rate of withdrawal is at a level sufficiently high to provide increased hydrogen peroxide forming capacity when such withdrawn working solution is regenerated and returned to the cyclic system.

Vacuum distillation is most frequently employed to remove solvent from depleted working solution. The temperature and pressure employed may vary widely, depending on many factors but are chosen in particular according to the distillation temperature of the specific solvent or solvents. It is also sound practice to use conditions which are not destructive of the solvent so that it may be recovered in useful form. Thus, to distill a depleted working solution comprised of 2-ethylanthraquinone derivatives, methylcyclohexyl acetate and dodecyl benzene, the working solution according to one specific embodiment hereof, is distilled in a conventional apparatus under about 20 millimeters of mercury absolute pressure while raising the temperature to 150° C. in the distillation residue. At a higher pressure a higher temperature is required. Any other temperature and pressure combination may be employed, providing the solvent be readily removable without decomposition of the residue. The residue resulting is substantially, but not necessarily entirely, solvent-free and is suitable for treatment in the practice of this invention. Up to approximately 15, and quite often above 10, percent of the residue by weight may be solvent, although lesser or greater amounts of solvent may be contained in the residue. The amount of solvent left in the residue, among other things, depends upon economics since solvent may deteriorate or otherwise be lost in the regeneration treatment. Usually it is sound practice to remove as much solvent as 90 to 99 percent or more of all solvent in the working solution prior to treatment.

In accordance herewith the temperature at which substantially solvent-free residue is heated ranges upwardly from 200 to 250° C. or somewhat higher and is maintained until substantial regeneration of actives (or hydrogen peroxide forming compounds) is accomplished. For example, with working solutions in which the active is 2-ethylanthraquinone, the heating is continued until there is a marked increase in this quinone and/or its tetrahydro derivative, but discontinued before conversion to one or both of these compounds either comes to a halt or the rate of conversion becomes too slow to be justified. Temperatures above 250° C., and as high as 300° C. or higher are possible. Above 275° C. some undesirable decomposition may occur with various alkylanthraquinones.

The heating period may be very short, i.e., as little as several minutes, 5 minutes for example at approximately 300° C. At 250° C. a heating period of 40 to 60 minutes produces the maximum conversion to quinones and minimum of inerts when 2-ethylanthraquinone is the active ingredient. Similar effects are attainable with other like alkylanthraquinones. Unduly extended treatments of 5 or 6 hours usually do not achieve as good a degree of reversion as that which is attained by the shorter treatment periods.

In a preferred embodiment hereof catalyst is employed to facilitate conversion (reversion) of inerts to actives such as 2-ethylanthraquinone. Illustrative of the type of catalyst preferred are those which provide high surface area, notably sodium alumina silicates. Any inorganic silicon compound providing high surface area such as silica, silica gel, inorganic silicates, viz., calcium silicate, mineral silicates, viz., magnesium silicate and especially mixed silicates, notably those having

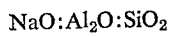

$$NaO:Al_2O:SiO_2$$

ratios from 1:1:1 up to 1:1:5, may be employed with valuable results. Other materials which have high surface area often may be employed with satisfactory results. Illustrative are bone charcoal, wood charcoal, channel black, precipitated metals such as nickel or palladium, and metal oxides of Groups III, IVB and VB of the Periodic Table of Elements, viz., iron oxide (ferric), alumina, titanium dioxide and vanadium pentoxide. Generally, any material having a surface area of from 5 to 1,000 meters per gram may be employed. The preferred materials of the silicate type have surface area values of from 5 to 400 meters per gram.

In those embodiments which employ catalysts, the catalyst in predetermined amount is added to the substantially solvent-free recovered 2-ethylanthraquinone derivatives obtained by distilling to remove therefrom most of the solvent as described hereinafter. The distillation residue mixture with catalyst is heated until the desired conversion results, after which the regenerated solids are dissolved in solvent and filtered to remove catalyst.

Use of catalyst is optional, although valuable. Amounts up to 30 grams or even more per 100 grams of distillation residue are illustrative. Larger amounts cause decreased efficiency of heat transfer. Thus, a preferred amount is about 16 grams of sodium aluminasilicate per 100 grams of distillation residue.

The treated residue of this invention may be re-introduced into a cyclic process for production of hydrogen peroxide by dissolving it in the working solution and by decantation, filtration, etc., removing insoluble impurities on catalyst (when present). Catalyst so separated may be re-used with or without further processing. Alternatively, the product of this invention may be re-dissolved in fresh solvent (or make up solvent), filtered, and returned as a solution for mixture with other working solution. It is expedient to re-introduce the re-dissolved regenerated solids at a point in the cyclic process after extraction but before hydrogenation. However, such material may be returned to the system at any other point in the cyclic process. It is usually not desirable to remove the reduced working solution from the cyclic process prior to oxidation for the purpose of re-dissolving regenerated solids because of the danger of losing hydrogen gas or because of the possibility of premature oxidation of working solution to form hydrogen peroxide. However, fresh make-up working solution or solvent may be employed to dissolve regenerated solids which may then be re-introduced to the cyclic system at any point including the hydrogenation state.

The reclaimed solvent may be employed as make-up solvent for new 2-ethylanthraquinone or as solvent for the regenerated 2-ethylanthraquinone derivatives resulting from the practice hereof. If desired, solution of the product of this invention may also be prepared in solvent other than the initial or recovered solvent mixture.

The invention has been described particularly in terms of a principal embodiment employing 2-ethylanthraquinone and its derivatives but it is also applicable to quinones and especially other alkylanthraquinones, such as 2-n-propylanthraquinone; 2-isopropylanthraquinone; 2-n-butylanthraquinone; 2 - sec - butylanthraquinone; 2-t-butylanthraquinone; 2-t-amylanthraquinone; 2-decylanthraquinone; and their hydrogenated derivatives or generally any saturated short chain aliphatically mono-substituted anthraquinone which is substituted in the beta position by such an alkyl group containing up to 10 carbon atoms.

While not intending to limit the invention in any way, the following examples illustrate the manner in which the invention may be performed:

EXAMPLE I

Working solution from storage after water extraction of the hydrogen peroxide content in a hydrogen peroxide plant employing the ethylanthraquinone process and which had become depleted to the extent that its hydrogen peroxide equivalent was approximately 4.0 grams per liter of working solution, was distilled at an absolute pressure of 18 millimeters of mercury until the residue reached a temperature of 150° C. From one liter of such solution there was obtained a residue of 151 grams containing 2-ethylanthraquinone derivatives. This residue was heated to 250° C. with 25 grams of a finely divided sodium aluminasilicate ($Na_2O:Al_2O_3:SiO_2$ percent by weight; 13.98, 19.47, 58.01; 76% coarser than 200 mesh but finer than 100 mesh). Samples of the heated mixtures were withdrawn at intervals and analyzed for 2-ethylanthraquinone, 2-ethyltetrahydroanthraquinone and inert material. Since approximately 15 percent by weight solvent remained in the initially heated material, all samples were analyzed for total solids, to permit expressing the analytical results on a solvent-free basis. The following data was obtained:

| Heating Time, minutes | EAQ, percent [1][2] | $H_4$EAQ percent [1][2] | Inert, percent | Useful Quinones, percent |
|---|---|---|---|---|
| 0 | 27.9 | 31.6 | 39.3 | 60.7 |
| 30 | 44.4 | 25.6 | 30.0 | 70.1 |
| 60 | 45.8 | 25.6 | 28.6 | 70.4 |
| 150 | 44.1 | 20.8 | 35.2 | 64.9 |
| 330 | 47.1 | 12.5 | 39.2 | 59.6 |

[1] EAQ=2-ethylanthraquinone. $H_4$EAQ=2-ethyltetrahydroanthraquinone.
[2] All quantities expressed as percent by weight (solvent-free basis).

Thus, it is shown that 2-ethylanthraquinone increases, while 2-ethyltetrahydroanthraquinone and inert material decrease. In the beginning, the 2-ethylanthraquinone increases by an amount greater than the decrease in 2-ethyltetrahydroanthraquinone indicating the net result is to form 2-ethylanthraquinone at the expense of the inert material and the total useful quinone content increased. As the treatment proceeds, 2-ethylanthraquinone continues to form.

EXAMPLE II

*Reversion of working solution solids to 2-ethylanthraquinone at 200–230° C.*

Working solution from the same source and like that of Example I was distilled to a temperature of 200 to 230° C. (at 730 millimeters of mercury barometric pressure) in the residue. The product was analyzed and compared with the composition found before distillation. From 5 liters of working solution, analysis disclosed the following composition prior to and after distillation.

| | Initial Working Solution | Composition of Distillation Residue |
|---|---|---|
| 2-ethylanthraquinone, grams | 173 | 205 |
| 2-ethyltetrahydroanthraquinone, grams | 177 | 147 |
| Useful quinones, grams | 350 | 352 |
| Inert material, grams | 336 | 310 |

Thus, heating of the residue at 200 to 230° C. which is achieved during solvent removal increases the quantity of 2-ethylanthraquinone at the apparent expense of 2-ethyltetrahydroanthraquinone.

Samples of this distillation residue were heated for various lengths of time at 200 to 230° C. and the composition determined.

| Substance | Composition, percent by weight | | |
|---|---|---|---|
| | Initial | 1 hour | 2.5 hours |
| 2-ethylanthraquinone | 24.2 | 29.5 | 29.5 |
| 2-ethyltetrahydroanthraquinone | 17.4 | 18.2 | 17.0 |
| Useful quinones | 41.6 | 47.7 | 46.5 |
| Inert material | 36.7 | 32.6 | 34.6 |

Thus, an approximate optimum amount of total useful quinones results after about 1 hour with a small amount of reversion of inert material at 200 to 230° C.

EXAMPLE III

*Non-catalytic reversion of working solution solids at 250° C.*

A sample of distillation residue obtained in Example II was heated rapidly at 230 to 250° C. and maintained at 250° C. for approximately 1 hour without catalyst. The following data indicates that the increased useful quinone was slightly less than the decrease in inert material.

| Composition | Residue, grams | Residue after Heating, grams |
|---|---|---|
| 2-ethylanthraquinone | 138.4 | 161.4 |
| 2-ethyltetrahydroanthraquinone | 99.5 | 101.3 |
| Useful quinones | 237.9 | 262.7 |
| Inert material | 209.5 | 180.0 |

Thus, 2-ethylanthraquinone is formed at the expense of inert material at 250° C.

*Example IV*

In lieu of the sodium aluminasilicate of Example I similar results may be obtained by heating 100-gram samples of residue obtained as in Example II, with 20 grams of various substances as follows:

Substance: Percent by weight*
- Control (before heating) ———————— 25.2
- Control (after heating, no catalyst) ———— 29.9
- $Na_2O/Al_2O_3/SiO_2$; percent by weight, 11.43/15.15/65.0 ———————————————— 46.0
- Calcium silicate (Silene EF, sold by Pittsburgh Plate Glass Company) ———————————— 41.2
- Magnesium silicate ($2MgO \cdot 3 SiO_2 \cdot 2H_2O$) — 37.9
- Titanium dioxide pigment (40 meters per gram surface area) ———————————— 44.0
- Wood charcoal (willow) ———————————— 37.5
- Alumina (200 square meters per gram surface area) ———————————————————————— 45.0
- Iron oxide (jeweler's rouge) ———————— 41.3
- Silica gel (340 meters per gram surface area) 40.6

*2-ethylanthraquinone content after 1 hour at 250° C.

Although this invention has been described by reference to special details of certain embodiments, it is not intended that the invention be construed as limited to such details except insofar as such details appear in the appended claims.

What is claimed is:

1. A process for increasing the hydrogen peroxide forming capacity of a working solution depeleted in its capacity to form hydrogen peroxide through use in a cyclic process for hydrogen peroxide by the alternate steps of hydrogenation and oxidation of a quinone dissolved therein, which comprises withdrawing working solution from the cyclic system, separating at least 90 percent of the solvent from solute leaving a solvent-lean residue of the quinone and its tetrahydroquinone, heating said solvent-lean residue to a temperature of at least 200° C. for a short period of at least 5 minutes and until there is a marked increase in the quinone content and hydrogen peroxide producing capacity of the residue and then discontinuing the heating before the rate at which the tetrahydroquinone content decreases exceeds the rate at which the quinone content is increasing.

2. The process of claim 1 wherein the quinone is 2-ethylanthraquinone.

3. In a cyclic process for the manufacture of hydrogen peroxide by alternate steps of hydrogenation and oxidation of a working solution of a quinone and hydrogenated derivatives thereof wherein the working solution becomes depleted in its capacity to form hydrogen peroxide, the improvement which comprises increasing the hydrogen peroxide forming capacity of the working solution by:

(a) removing upwards of 90 percent of the solvent from working solution depleted in hydrogen peroxide forming capacity to produce a solvent-lean residue containing up to 15 weight percent solvent, (b) heating said residue to a temperature upwardly of 200° C. to 300° C. and for from 5 to 90 minutes, and (c) returning residue treated in step (b) to working solution in the cyclic process.

4. The process of claim 3 wherein the quinone is 2-ethylanthraquinone.

5. The process of claim 3 wherein step (b) comprises heating the residue in contact with a catalyst.

6. The process of claim 5 wherein the catalyst is a sodium aluminasilicate.

7. The method of claim 5 wherein the working solution removed in step (a) is withdrawn from a point in the cyclic process subsequent to the hydrogen peroxide extraction and prior to hydrogenation step.

References Cited

UNITED STATES PATENTS 2,940,987  6/1960  Eller et al. ——————— 23—207

FOREIGN PATENTS 896,346  5/1962  Great Britain.

OSCAR R. VERTIZ, *Primary Examiner.*

H. S. MILLER, *Assistant Examiner.*